Figure 1:
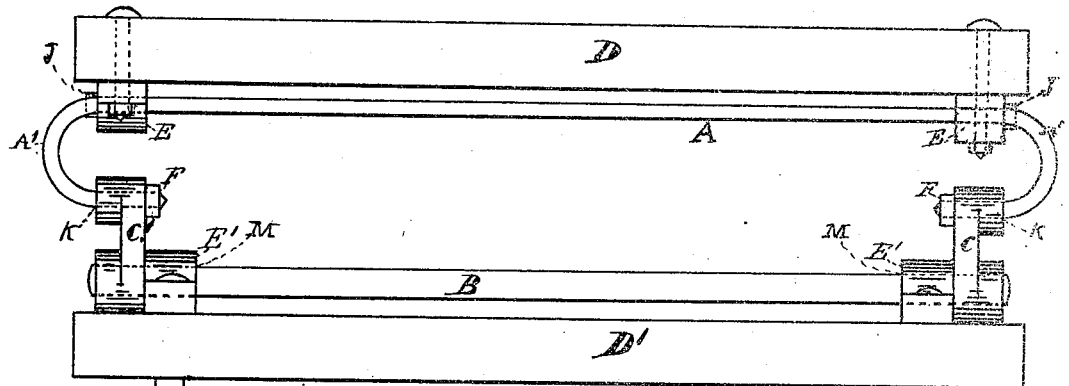

C. W. SALADEE.
Improvement in Springs for Vehicles.

No. 132,693.  Patented Oct. 29, 1872.

Witnesses.  
C. W. Saladee Jr.  
G. B. Saladee

Inventor  
Cyrus W. Saladee

UNITED STATES PATENT OFFICE.

CYRUS W. SALADEE, OF ST. CATHARINES, CANADA.

IMPROVEMENT IN SPRINGS FOR VEHICLES.

Specification forming part of Letters Patent No. 132,693, dated October 29, 1872.

*To all whom it may concern:*

Be it known that I, CYRUS W. SALADEE, late of St. Catharines, in the Dominion of Canada, have invented certain new Improvements in Springs for Vehicles, of which the following is a specification embodying my invention.

Nature and Object.

The first part of my invention has for its object the complete equalization of torsional spring by means of one or more equalizing-shafts so applied and operated in connection with the springs as to compel them to act in unison each with the other, and so as to prevent side motion when more of the load is on one side of the body of the vehicle than on the other, and at the same time prevent undue strain upon any one or more of the springs employed. The second part of my invention has for its object the attainment of a greater degree of vibrating motion to the body of the vehicle to a given degree of torsional action of the springs. It is a fact well known that, when we make a torsional spring strong enough to carry the weight imposed, there is a rigidity in its action far greater than that in elliptic springs of like strength and capacity. In torsion-springs the lateral lever-arms must of necessity be made short and the movement of their outer ends, on which rests the load, limited to such a degree as to give, at best, but a short, stiff, and uneasy motion as compared with elliptic springs. The third part of my invention relates to the manner of arranging the springs in pairs so that their opposite bearings, where the lateral lever-arms turn off, may be on a parallel line with the edge of the bed-plate and directly opposite to each other.

By a slight modification in the arrangement and proportion of the several parts constituting my present invention I purpose applying it to all and every description of wheeled vehicles, from the lightest pleasure vehicles to railway cars, as well as for all other purposes where I may find the same applicable and desirable.

The Drawing.

Figure 4:
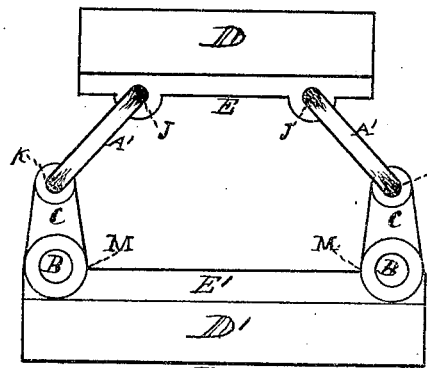
Figure 2:
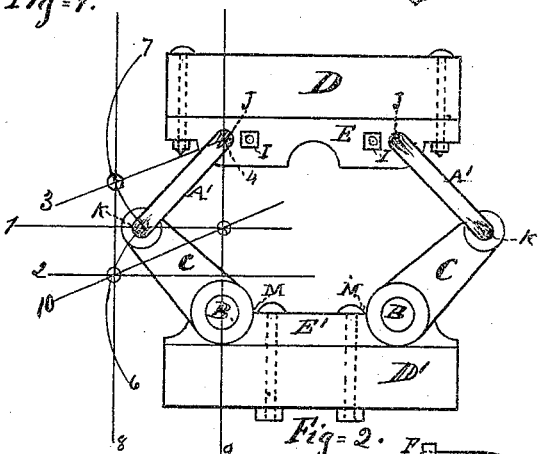
Figure 3:
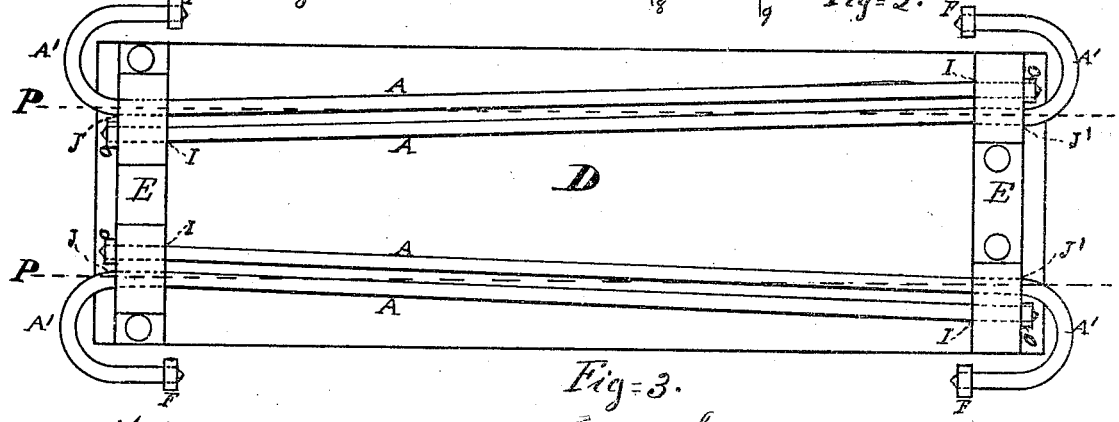

Figure 1 is a front elevation; Fig. 2 is an end view of Fig. 1; Fig. 3 is a bottom view of the bed-plate D, showing the arrangement of the springs; and Fig. 4 is likewise an end view of Fig. 1, of another modification, showing a different position of the cranks C than seen in Fig. 2, otherwise the same.

On the lower bed-plate D' are secured two equalizing-shafts, B, a side view of which is had in Fig. 1, and the ends are shown in Fig. 2. These shafts B are held in their bearings M so as to allow them to oscillate freely when actuated by the cranks C, which are rigidly secured to their outer ends, as plainly seen in the drawing. On the under surface of the bed-plate D is arranged, in pairs or sets, the springs A, as clearly shown in Fig. 3. It will be seen, by reference to this last-named figure, that the bearings J and J' of the lever ends of the springs are exactly opposite to each other in the direction of the parallel dotted lines P and P, while at the same time the straight bodies of the springs are likewise parallel to each other although not parallel with the edges of the bed-plate. The end of each spring opposite the lever end is squared and passes through a corresponding hole in the journal-bearing E at I, and is there firmly held by means of a screw-nut, as shown in the drawing. The lever-arm A' of the spring A I make by bending it in a semicircular form, and cut a screw-thread on the outer end to receive the nut F. The lever-arms A' I form on the outer end of the rod by one operation, on a semicircular former made expressly for the purpose, and leave the end long enough to make a good bearing, K, in the ends of the oscillating cranks C. It will be understood, of course, that the lever ends of the springs A are admitted free play in the bearings J and J', while the opposite ends at I are rigidly held in position, as already described; and it will also be seen, by reference to Fig. 3, that the squared ends at I and the nuts O will firmly hold the springs in their loose bearings J and J' without any further provision for that purpose. The turned ends of the lever-arms A' are passed through their bearings K in the cranks C, and there held by the screw-nuts F. Now, by consulting Fig. 2, we see the proper relative position of the oscillating cranks C to the lever-arms A', although, if preferred, the cranks may be placed in a perpendicular position, as seen in Fig. 4. This substantially completes the arrangement and combination of the several parts, as designed, and from which it will be seen that as the springs at either end of the bed-plate are actuated a corresponding action is imparted to the cranks C, and which latter, through their respective equalizing-shafts B and B, compel a like motion to the lever-arms and cranks on the opposite ends of the bed-plate, and thus not only do we secure a positive unity of action of all the springs, each with the other, but the strain or load imposed upon them is also equalized so that each spring will receive, through the shafts B and B, its due proportion of the strain of the whole load, even if the whole weight is on the one end or the other of the bed-plate D, and thus reduce the liability of breaking the springs, or any of them, very materially. This feature of my invention is especially valuable in all vehicles carrying heavy loads—as wagons when passing over sideling or rough roads, or in railway cars running sharp curves—as under every and all circumstances the undue strain imposed upon one end of the bed-plate is instantly transmitted to the springs at the opposite end.

The outer ends of the lever-arms of all torsional springs heretofore known or used are made to rest upon a solid surface, whether operated upon "rockers," "friction-rollers," "friction-plates," or whatever other device, and the vibrating motion imparted to the body is in exact proportion to the movement of the outer ends of the lever-arms—as, for example, let line 1 represent the permanent bearing of the arm A', and now let us suppose that the pressure upon the springs had forced the arm around in its circular course on line 7 till it reaches the line 3, when it is plain that the body or bed-plate D has been depressed only so far as the end of the arm has traveled from line 1 to 3 on the perpendicular line 8. But now let us take away the imaginary permanent bearing represented by line 1 and examine the same action of the arm with its bearing in the end of the oscillating crank C, and we shall find that the same degree of torsional action which brought the arm in the position of line 3 has forced the end of the crank C down in its circular course on line 6 to line 2, when the arm A' must take the position of the points on line 10, and when the body or bed-plate D will have been depressed a distance equal to the space on line 8 between lines 2 and 3, exactly twice as far as in the other case. And this fact remains the same whether I use the equalizing-shafts or not. And I will here state that I contemplate, in all cases where that is desirable, to use the arrangement of arms and cranks shown in Fig. 3, without the equalizing-shafts B. And, finally, another valuable feature resulting from this arrangement of arms and cranks is, that I get the best possible frictional bearings at K, in or upon which to operate the outer ends of the lever-arms A', that can be devised for that purpose, together with great strength and positive safety in this connection.

Claims.

I claim as my invention—

1. In combination with torsional springs, the equalizing-shafts B and B.

2. In combination with the lever ends of torsional springs, cranks C, arranged and operating substantially as and for the purpose set forth.

3. The arrangement of torsional springs A in pairs so that the bearings J and J' shall be on a parallel line with each other and with the edges of the bed-plate, as and for the purpose set forth.

CYRUS W. SALADEE.

Witnesses:
C. W. SALADEE, Jr.,
G. B. SALADEE.